INVENTORS
CHARLES EAMES
DON ALBINSON
BY Price and Heneveld
ATTORNEYS

INVENTORS
CHARLES EAMES
DON ALBINSON
BY Price and Heneveld
ATTORNEYS

INVENTORS
CHARLES EAMES
DON ALBINSON
BY Price and Heneveld
ATTORNEYS

July 10, 1962 C. EAMES ET AL 3,042,978

STORAGE

Filed Nov. 6, 1959 4 Sheets-Sheet 4

INVENTORS
CHARLES EAMES
DON ALBINSON

BY Price and Heneveld

ATTORNEYS

United States Patent Office 3,042,978
Patented July 10, 1962

3,042,978

STORAGE

Charles Eames and Don Albinson, Venice, Calif., assignors to Herman Miller Inc., Zeeland, Mich., a corporation of Michigan Filed Nov. 6, 1959, Ser. No. 852,589
4 Claims. (Cl. 20—1.11)

This invention relates to a means of allocating space and of furnishing a room and more particularly to such a means which, in itself, is a system suspended from a wall.

The cost of construction many types of housing facilities, such as dormitories, motels and hotels is now so great that it has become essential that the space in each room or subdivision of such a building be used to its maximum efficiency. Failure to do this results in a capital investment so great that the space cannot be rented at a rate which will amortize the initial investment. To overcome this difficulty, there has been an ever increasing trend toward built-in facilities in such construction. Such facilities as vanities, wardrobes, desks and chests have been incorporated as permanent portions of the wall and building structure. Rooms with such facilities may be made smaller than rooms conventionally furnished and yet afford the desired impression of spaciousness necessary to make them useful and attractive. This invention goes further and incorporates into the basic building structure not only such storage units but a number of the service or accommodation units required in such rooms. Among these are beds, chairs, cots, desks and tables.

Conventional built-in facilities have certain serious limitations which have greatly restricted their application and utility. This invention overcomes these limitations. One of the greatest problems that has characterized built-in facilities of the conventional type is the fact that they are static. Once incorporated, they cannot be modified except at excessive cost. Further, repair and replacement is slow and expensive. Since the facilities of this type determine the limits of the utility of the space into which they are incorporated and to a large extent control its practicality and dictate the limits of its practical usefulness, facilitates which cannot be modified economically greatly restrict adaptation of the structure to changing demands.

This invention overcomes this difficulty and many others inherent in the conventional built-in facility system by standardizing the basic components and making them attachable and detachable. The components may be attached or removed without damage to either the building or the components. They may be arranged and rearranged time and time again into an unlimited number of combinations. This permits the character of the facilities they provide to be changed at will either temporarily or permanently to meet varying demands placed upon the particular facilities in which they are installed.

A further advantage of this invention is the fact that installation, modification and replacement are quick, simple, and inexpensive, requiring no special equipment or tools. The various components are reusable and thus may be moved from one facility to another. The parts are freely interchangeable, facilitating modification and relocation. The invention is particularly adapted to rugged, durable construction. This is essential for facilities of a public or semi-public character.

This invention contemplates a system wherein all of the facilities it provides are detachably supported on a wall, making no contact with either the ceiling or the floor. This leaves the floor clear and readily accessible for cleaning. It assures complete sanitation of the facilities. Also, it induces constant ventilation of the storage facilities which is most important from a sanitary point of view.

The invention also permits the ceiling to be washed or painted without interference. The walls may be readily redecorated even to the extent of complete temporary removal of this equipment for this purpose.

Over and above all this, the invention has another extremely important advantage. It permits each unit of space, such as a dormitory room, a motel room or a hotel room, to be made smaller yet afford the user a greater feeling of spaciousness and a greater degree of utility for the actual space utilized. Most of these rooms have to serve two purposes which are, to a large extent, in conflict with each other. During the daytime the room must provide comfortable seating facilities, writing facilities and means whereby several people can gather, such as for a private conference. On the other hand, at night the room must provide adequate storage facilities for clothes and other items plus comfortable sleeping facilities. In any room, a bed is a large item occupying substantial floor area. In the daytime it is largely useless and, in fact, occupies so much space in the average room as to render it, for all practical purposes, useless for normal daytime activities. Again, at night such items as chairs and work tables are of no value. This invention overcomes this problem by disposing of the bed during the day and of such facilities as the seating and low tables at night, thus clearing the floor space so that it may serve double duty without giving the room a crowded appearance. Thus, a smaller room involving a reduced capital investment may be utilized without in any way destroying the utility and desirability of the room itself.

These and other objects and purposes of this invention will be understood by those acquainted with the design and construction of both buildings and furniture upon reading the following specification and the accompanying drawings.

In the execution of the basic principles of this invention, a pair of support means, such as a pair of rails, are incorporated in or secured to a wall in vertically spaced relationship so that they extend horizontally along the wall. The area adjacent the wall is divided into various service sub-areas by means of panels hung from these rails. The panels are slidable along the rails to determine the size and number of space subdivisions to be created adjacent the wall. Means are provided for detachably locking these panels to the rails at selected spacings so that various service facilities may be installed between the panels. The service facilities include chests, wardrobes, book shelves, desks, beds, vanities and similar basic necessities for a room such as a hotel, motel or dormitory.

Figures 1, 2:
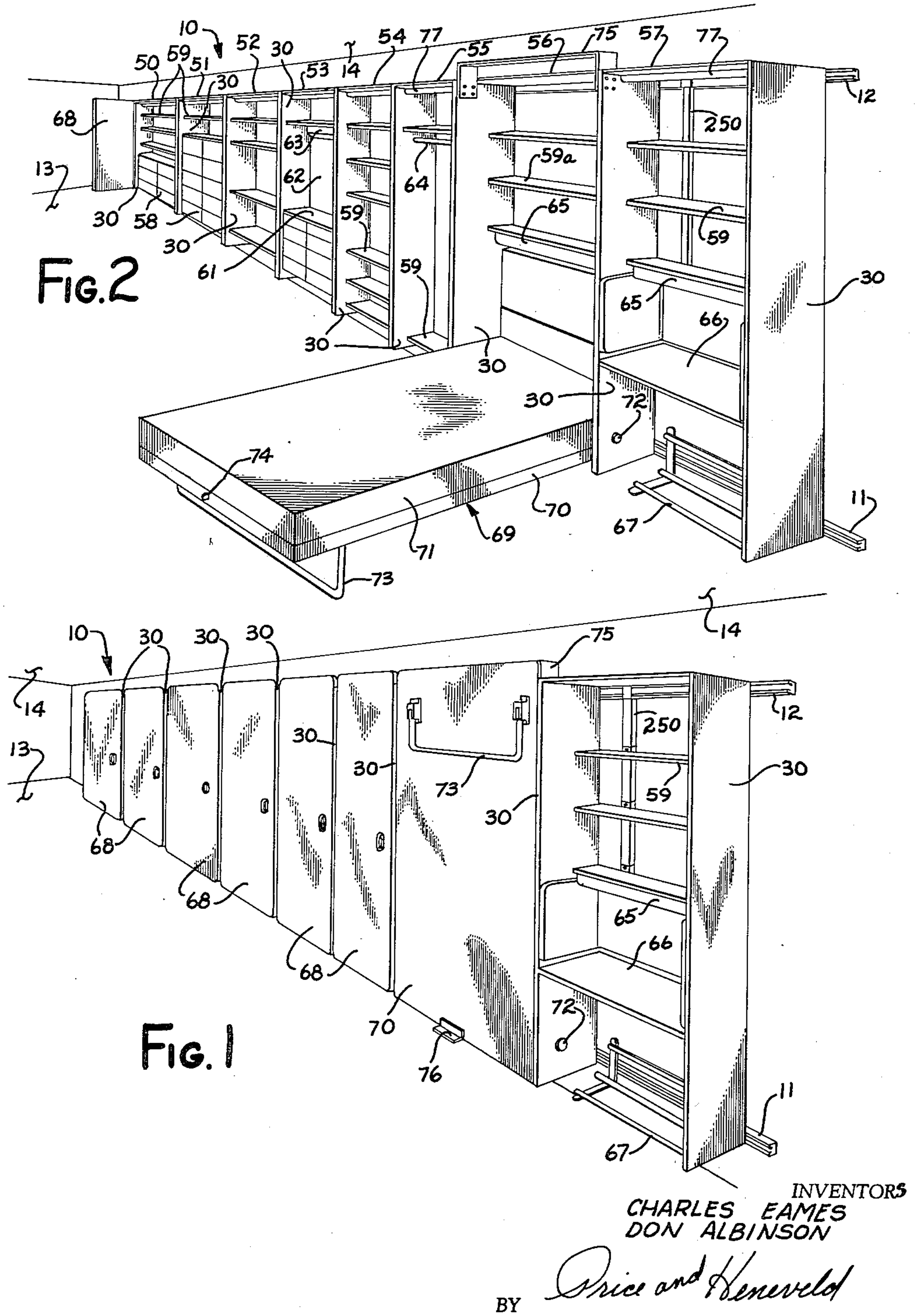
FIG. 1 is an oblique view of a wall of a room incorporating this invention.
FIG. 2 is an oblique view of the same wall showing the same facilities with the doors either open or removed.
Figure 3:
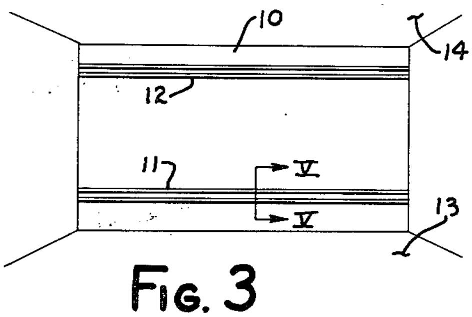
FIG. 3 is a fragmentary oblique view of a room showing one wall equipped with the supporting rails for this invention.

Referring specifically to FIGS. 1 and 2, the numeral 10 indicates a wall of a room. Secured to the wall 10 are a pair of rails, a lower rail 11 and an upper rail 12. As specifically indicated in FIG. 3, these rails are horizontal and parallel. The lower rail is spaced a significant distance above the floor 13 and the upper rail is spaced a significant distance below the ceiling 14. While it is not essential to this invention, it is considered a preferable embodiment of the invention where the rails extend the entire width of the wall on which they are mounted in the manner suggested in FIG. 3. Further, merely because this invention is described as applied to a single wall of a room, it is not to be considered as so limited. It can be applied to all walls of the room, if desired.

Figure 5:
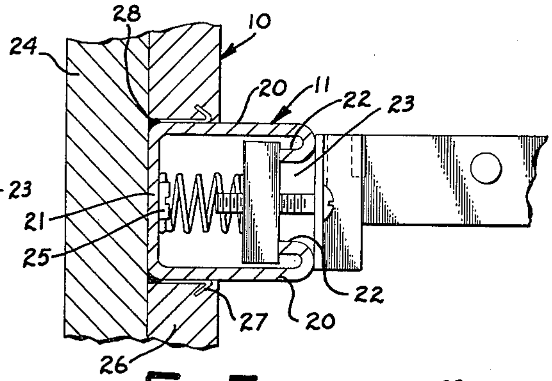
FIG. 5 is a fragmentary enlarged sectional elevation view taken along the plane V—V of FIG. 3 and illustrating the rail structure and the attachment of the panels to the rail.

The structure of the rail is specifically illustrated in FIG. 5. In this case, a lower rail 11 is shown and in describing the lower rail 11, it is to be considered that the upper rail 12 is also being described since it is identical in both shape and mounting. The rail is basically a U-shaped channel having a pair of sides 20 and a bottom or connecting web 21. The free ends of the sides 20 are turned over upon themselves to form inwardly extending terminal flanges 22. The terminal flanges are spaced apart to form an open access channel 23 extending the length of the rail. It will be understood that the specific shape of the rail illustrated is merely a preferred embodiment and that various other types and shapes of rails may be utilized with this invention.

When the rail is incorporated in the wall as part of the initial construction of the wall, it is preferably partially embedded in the wall. In this case the rail is rigidly secured to the primary supporting structure 24 of the wall 10 by any suitable means such as screws 25, bolts or any other means which will withstand the heavy loadings applied to the rails by this invention. If the wall's primary supporting structure is steel, the rail can be secured by welds as suggested at 28. In the installation illustrated, a portion of the rail is embedded in the surface treatment of the walls, such as the dry wall or plaster 26. A metal plastering edge 27 may be utilized to obtain a neat junction between the rail and the plaster.

Figure 6:
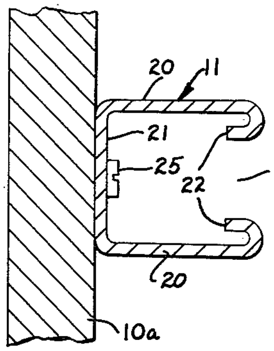
FIG. 6 is a fragmentary enlarged sectional elevation view of a modified mounting for the supporting rail.

It will be recognized that while only a portion of the rail is embedded this invention will permit the entire sides of the rail to be embedded where the construction of the wall permits.

Where the invention is applied to existing facilities, the rail 11 may be mounted on the surface of the wall as the wall 10*a* in FIG. 6. In this case the same fasteners 25 are utilized to anchor the rail but normally they will be somewhat longer in order to obtain a secure grip upon the primary wall structure.

Figure 4:
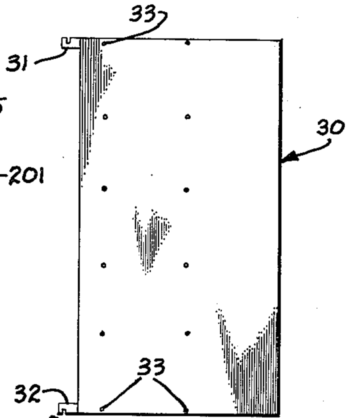
FIG. 4 is a side elevation view of one of the divider panels utilized in this invention.
Figure 7:
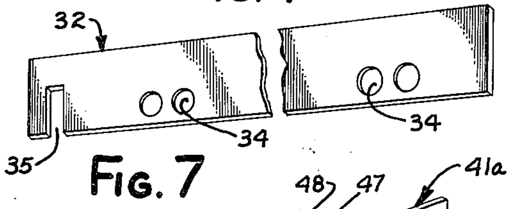
FIG. 7 is a broken oblique view of one of the panel attachment splines.
Figure 10:
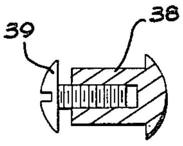
FIG. 10 is a central sectional view of one of the T-nuts used in the panel construction.

The rails 11 and 12 are the sole support means for the divider panels 30 (FIG. 4). The divider panels 30 may be of any suitable construction so long as they will withstand the loads imposed upon them in actual use. For example, they may be of plywood or composition board or any other suitable construction. Their exact height and width is determined by the height and width of the particular service areas it is desired to create adjacent the wall on which this invention is mounted. In fact, in any particular installation a group panel of one, two or more selected widths may be employed. Each of the panels 30 has an upper spline 31 and a lower spline 32. The splines are generally rectangular bars designed to be seated in a suitable slot or channel in the upper and lower edges of the panel 30. It is secured to the panel by suitable fastener means such as the T-bolts 33 (FIG. 10) which pass through the holes 34 in the spline (FIG. 7). The rearward end of the spline projects beyond the back edge of the panel and has a slot 35 (FIG. 7) extending from one edge of the spline partially across the spline parallel to its end. In the case of the lower spline 32, and slot 35 opens downwardly.

The upper spline 31 is identical to the lower spline 32. However, when it is secured to the panel 30, it is inverted whereby the slot 35 opens upwardly. This arrangement of the slots in the spline causes the weight of the panel to be applied entirely to the lower rail and the tension generated by the panel to be applied entirely to the upper rail. Thus, the two types of loadings are divided between the rails.

Each of the panels preferably has a predrilled hole pattern 37 to receive the T-nuts 38. These holes provide a means of attachment for the various service units such as shelving, desks and drawer slides installed between the panels. Each of the T-nuts (FIG. 10) has a bearing end 38 and a tightening screw 39. The bearing end 38 has a head and an elongated tubular bearing shank internally threaded to receive the tightening screw 39. The tightening screw 39 is also headed so the T-bolt can be tightened from that end. The T-nuts need not have a slot but could have a slot or other means for tightening, if desirable.

Figure 8:
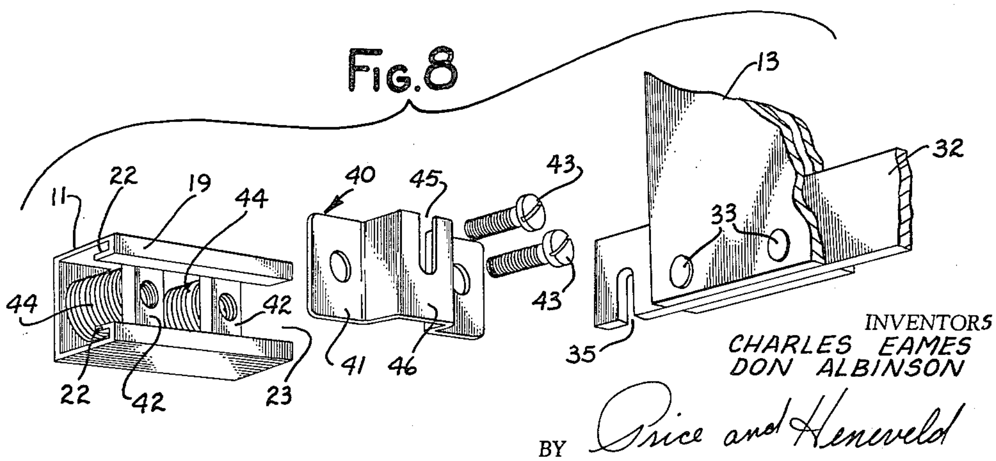
FIG. 8 is an oblique, fragmentary exploded view of the means of attaching the panel to the rail.

Secured to the rails are anchor fittings 40 (FIGS. 5 and 8). Each of the anchor fittings has a cap 41, a pair of nuts 42, a pair of screws 43 and a pair of springs 44. The cap 41 is generally hat-shaped, having an outwardly projecting central section. The screws 43 pass through the side wings of the cap 41 and engage the nuts 42 inside the rail 11. The nuts 42 are designed to seat upon and engage the inturned flanges 22 of the rail. While the screws 43 are being tightened, the nuts 42 are held against the flanges 22 by means of the springs 44. Thus it will be seen that the springs can be dispensed with so far as the structure is concerned once the nuts have been secured to the screws and, in fact, the springs serve no essential purpose at any time. The nuts 42 are rectangular in shape so that they will pass through the open slot 23 in the face of the channel 11 and when rotated 90 degrees within the channel will make bearing against the inner ends of the flanges 22.

The outwardly projecting central portion of the cap 41 has a slot 45 extending partially through it and so positioned that when the cap is anchored to the rail the slot is vertical. When the anchor fittings 40 are mounted on the lower rail 11 as shown in FIG. 5, the cap is so positioned that the slot 45 opens upwardly. When the anchor fittings 40 are mounted to the upper rail 12, the cap 41 is inverted so that the slot 45 opens downwardly. The width of the slot 45 is such that it will just receive one of the splines 31 or 32. The outward height of the central portion of the cap is such that the end of the spline will be received into it when the slot 35 on the spline has received the bridge 46 in the central portion of the cap. This produces a positive structural interlock between the cap and the spline, locking the spline to the cap. The anchor fittings 40 together with the splines 31 and 32 constitute hangers for the panels 30.

Figure 9:
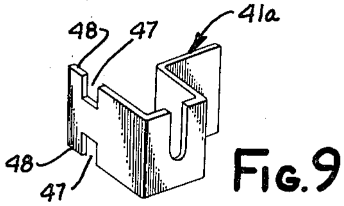
FIG. 9 is an oblique view of a modified hanger element.

In some cases it is necessary to mount one of the panels 30 next to a wall. When this occurs a special cap 41*a* must be used (FIG. 9). The special cap 41*a* has only one side wing. Opposite the side wing the side of the cap is extended sufficiently to project into one of the rails 11 or 12. Both edges of the extended side are notched at 47 to clear the inturned flanges 22 of the rails. This leaves a pair of ears 48 which seat under the flanges 22 to anchor the cap to the rails.

Since the panels 30 have the slot in the upper spline opening upwardly and the slot in the lower spline opening downwardly, the panels are positively secured against displacement from the wall once the anchor fittings 40 are mounted on them and the anchor fittings are secured to the rails 11 and 12. It will be seen that by loosening the screws 43, the anchor fittings may be moved lengthwise of the rails 11 and 12 to any selected position and then secured by tightening the nuts. There is no preformed hole pattern limiting the positioning of the panel along the rails at any predetermined, incremental modules.

Figure 18:
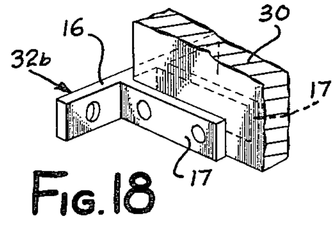
FIG. 18 is a fragmentary perspective view of a further modified bracket for attachment of the invention to the wall.
Figure 17:
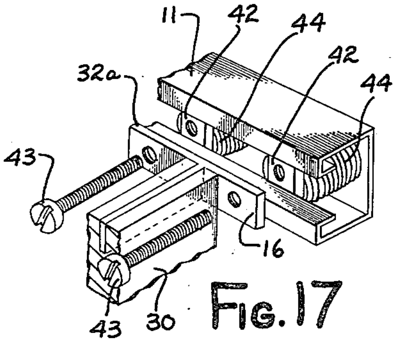
FIG. 17 is an exploded fragmentary oblique view of a modified means of attachment of the panels to the wall.

FIG. 17 illustrates a modified means for anchoring the panels 30 to the rails 11 and 12. In this construction the same bolts 43, nuts 42 and springs 44 are used. However, the spline 32*a* is T-shaped and its head 16 seats against the face of the rail 11. The bolts 43 secure it to the rail 11 through holes adjacent the ends of the head. FIG. 18 shows a further modification of the spline. Here the spline 32*b* has a head 16 and a pair of spaced parallel arms 17 designed to embrace the panel 30. The spline 32*b* is secured to the rail in the same manner as the spline 32*a*.

Figures 11, 19:
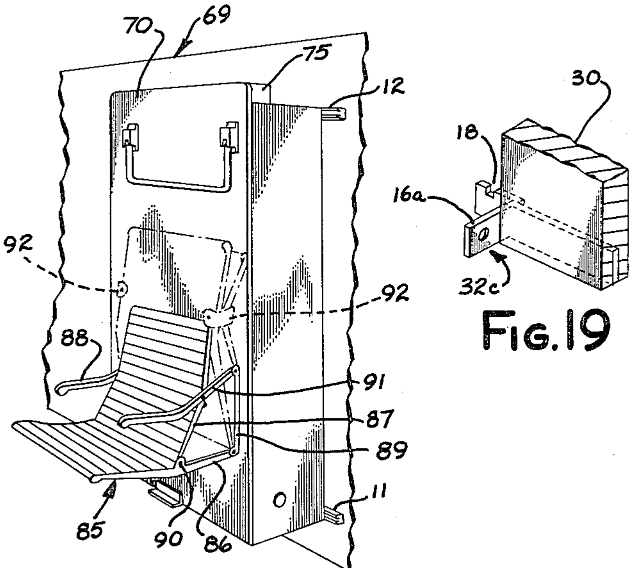
FIG. 11 is an oblique view showing a dual purpose bed having a folding chair mounted on the bottom of the bed.
FIG. 19 is a fragmentary perspective view of one of the brackets for attaching this invention to a wall modified for use in a corner.

FIG. 19 illustrates the spline modified for use in a corner where a projecting portion on one side of the head would interfere with the wall. Here the spline 32*c* has a generally L-shaped head. One leg of the head 16*a* is notched on both sides at 18 so as to receive the inturned flanges of the rail 11. This leg is turned to pass through the open face of the rail then rotated to seat the notches about the rail flanges. The other end of the head 16*a* is then secured in the usual manner. This arrangement permits panel installation against a wall parallel to the panel. It will be recognized that in each of these modified constructions the spline at the other end of the panel will be of similarly modified construction.

In equipping a room with this invention, as many panels are mounted on the rails as are necessary to divide the area adjacent the wall into the number of units desired. Thus, as illustrated in FIG. 2, nine panels 30 are mounted on the wall. These panels divide the area adjacent the wall into various types of service compartments. Thus, one space 50 becomes a combination general storage unit. The next space 51 is a wardrobe. The next adjacent space 52 is a storage unit for larger objects such as suitcases. The next adjacent space 53 is a vanity and the next space 54 is suitable as book shelving. The space 55 is a wardrobe, the space 56 a bed and the space 57 a desk. The allocation of these compartments to these particular services is merely exemplary since various other types of services may be provided in these compartments. The width and size of the panels may be changed. The spacing at which the panels 30 are arranged may be changed to produce an almost unlimited number of patterns and groupings. In the same manner the type and number of the service compartments created by the panels may be changed as needed.

It is important that all of the facilities provided in each of the compartments created by the panels 30 are supported either on the panels or directly on the rails 11 and 12, with none of these facilities being supported on either the floor or from the ceiling. It will be noted in FIGS. 1 and 2 that the panels 30 themselves stop short of both the floor and the ceiling so that they themselves are anchored to and are supported solely by the wall. The particular facilities that can be provided in each compartment or service area is so variable that all that can be described is one possible arrangement. Thus, in the compartments 50 and 51, the lower portions are occupied by drawers 58 suspended from the panels 30 by suitable means such as screws or T-bolts. Above the drawers and supported between the panels 30 are shelves 59. The shelves 59 are between and wholly supported by the panels 30. The vanity compartment 53 has drawers 58 in its lower portion, a work surface 61, mirror 62 and light 63. The wardrobe compartment 55 has a storage shelf 59 at both upper and lower ends and a clothes hanging bar 64. The compartment 56 for the bed has small storage shelves 59*a*, such as for books, and a light 65 for the bed. The structure of the rest of this compartment will be described subsequently.

The desk compartment 57 has shelves 59 such as for books, a light 65, a desk 66 and a foot rail 67.

The compartments 50–55 are each closed by means of a door 68. These doors may be of any suitable panel construction and material, such as plywood, composition board or some other type of material which encloses the compartments. The doors 68, however, do not touch either the ceiling or the floor. The bed 69, in turn, has a panel-like supporting frame 70 and a mattress 71. The frame is pivotally secured by pivots 72 to the two panels 30 defining the bed compartment 56. The bed is rockable about the pivots 72 from a horizontal position, as shown in FIG. 1, to a storage or vertical position as shown in FIG. 1. When the bed is in storage or vertical position, the bottom face of the panel 70 becomes a flush closure surface for the compartment 56, matching the doors 68. In lowered position, the outer end of the bed is supported by a leg bar 73. When the bed is folded or raised, the leg bar 73 may be folded down against the face of the panel 70. The bed is locked in vertical or storage position by a latch means 74 engaging the cross bar 75 (FIG. 2). The latch means may be disengaged by manipulation of the foot pedal 76 (FIG. 1) since they are connected by the link 76*a* (FIG. 13) extending lengthwise of the bed platform 70.

While it is not essential to this invention, it is considered preferable to make all the drawers 58 and shelves 59 or 59*a* of an open mesh construction. Even the panels defining the tops of the compartments are preferably of this construction. For this purpose, a grid work of wires welded together and similar to a basket is desirable. These wires may be coated with a suitable material such as a synthetic resin. For this purpose a nylon or a vinyl coating is satisfactory. This prevents rust, covers any rough areas and substantially reduces the noise resulting from operation. It is also possible to use molded plastic, metal or wooden drawers and shelves which are perforated to afford ventilation.

The open mesh construction affords free ventilation. It also makes it easy to ascertain the contents of a drawer without opening it. Dirt falls through to the floor below where it may be easily removed since the invention eliminates all obstructions on the floor.

At the top of each of the compartments, except that for the bed, is a light 77. The lights are below the tops of the doors 68 and are mounted either to the side panels or to the door itself. These light the compartments when the door is open and afford indirect lighting for the room.

When the doors 68 are closed, the lights 77 are concealed but are still effective for lighting the room.

Figure 13:
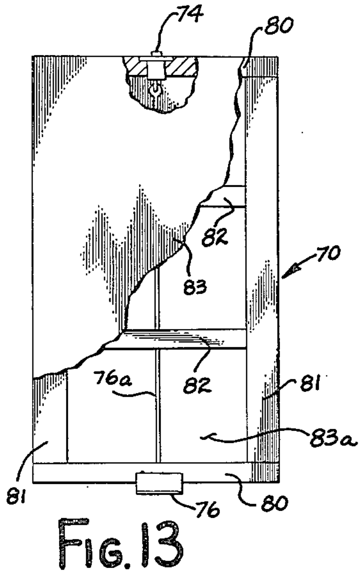
FIG. 13 is a partially broken view of the platform for the bed.
Figure 12:
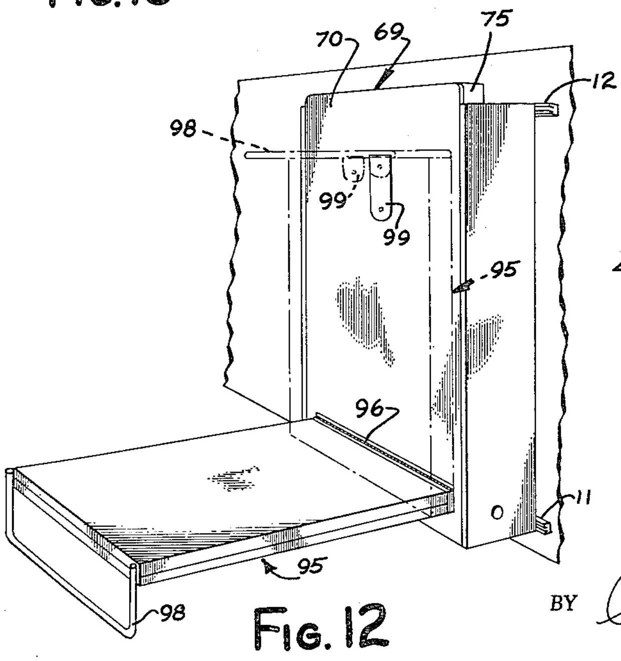
FIG. 12 illustrates a modification of the arrangement shown in FIG. 11 with a low table or cot substituted for the chair.

FIGS. 11 and 12 illustrate a slight modification of this invention in which at least the bed unit is so constructed as to have a dual purpose. The panel 70 forming the bottom of the bed or the closure element for the bed compartment, when the bed is raised or folded, is so constructed internally that other units may be mounted upon it which are useful and available when the bed is in raised or folded condition. FIG. 13 illustrates a construction for the bed platform 70 which will permit this. In this case the bed platform has a structural frame consisting of a pair of end rails 80, a pair of side rails 81 and two or more intermediate rails 82. It will be recognized that more or less intermediate rails may be used, as required. This frame is enclosed on one face with a skin 83 and on the other face with a skin 83*a*. These skins may be of any suitable material such as plywood, a dense pressed wood board or other material. The whole is preferably joined into a single structural unit by suitable adhesives.

Mounted to the back face of the bed platform 70 is a folding chair 85 (FIG. 11). The chair has a seat frame 86, a back frame 87 and a pair of arm frame members 88. The inner or rearward ends of the seat frame members 86 are pivotally attached to the anchor brackets 89 as are the rearward ends of the arm links 88. The back frame member 87 is pivotally attached to the seat frame member at the pivot 90. It is also attached to the arm links at the pivot 91. This permits the chair to fold from the open position shown in solid lines to the folded or storage position shown in phantom lines. In its storage position it is substantially flat against the surface of the bed platform 70. The chair 85, in folded position, is secured to the bed platform by suitable means such as straps 92.

The chair is entirely supported by the bed since the anchor brackets 89 are secured to the bed platform 70 by any suitable means such as screws threaded into the side rails 81 or the intermediate rails 82. It may also be secured by T-bolts similar to that illustrated in FIG. 10 extending through the bed platform. It will be noted that the chair in both folded and open positions has no structure touching the floor, being entirely supported on the bed. Before the bed is lowered, the chair is folded and latched or secured by the straps 92. The bed can then be released and rocked down into sleeping position, as shown in FIG. 2. In this case, the chair being folded up under the bed platform is stored beneatth the bed but is spaced above the floor, suspended below the bed. In this case, the location of the foot treadle 76 for the bed securing latch is particularly desirable in the center beneath the chair. This tends to prevent accidental release of the bed supporting latch and at the same time tends to prevent any possibility of lowering the bed before the chair has been folded to afford access to the bed release latch.

FIG. 12 illustrates an alternative use of the bed as a support for other units of furniture when the bed is in folded position. In this case a platform 95 is substituted for the chair 85. The platform 95 is hinged to the bed at 96 by any suitable means such as a piano hinge.

The outward or forward end of the platform 95 has a supporting leg 98. Thus the platform on one end is supported entirely on the bed and on the other end by the leg 98. Before the bed is folded into storage position, the platform 95 is folded into storage position flat against the outer face of the bed platform 70. In this position it is retained by any suitable means such as the strap 99. When the bed is lowered, the legs 98 also serve as the support for the outward or forward end of the main bed. Thus, they serve in both positions of the bed unit.

The platform 95 may be designed for any one of several purposes. It could be so designed that it serves as a day time lounge, cot or sofa. It could be in the form of a work bench or coffee table. It will be recognized that if desired the whole unit may be moved up the bed so that it would provide a full height table such as a desk or drafting table. In this case, admittedly, the outward supporting legs could not serve both the bed and the table but this would be immaterial to the dual character of the furniture. It is also obvious that the dual character of this furniture is illustrative rather than exhaustive of the various types of dual purpose usages which may be incorporated into a room by the use of this invention.

Figure 20:
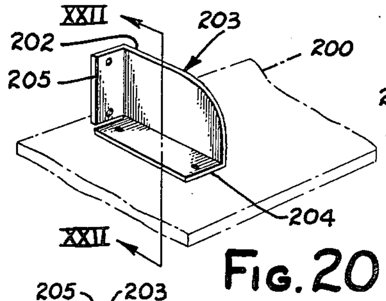
FIG. 20 is a fragmentary perspective view of a shelf bracket for this invention with the shelf illustrated in phantom.
Figure 21:
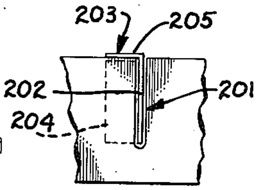
FIG. 21 is a plan view of the bracket illustrated in FIG. 20.
Figure 22:
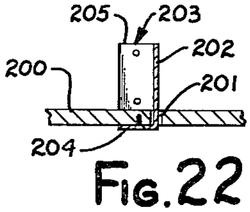
FIG. 22 is a sectional elevation view taken along the plane XXII—XXII of FIG. 20.

FIGS. 20, 21 and 22 illustrate a modified form of shelf hanger which is particularly useful for shelves mounted in either the desk or bed compartments, although its utility is not limited to these locations. In this case, shelf 200 is slotted at 201, a portion of its width from the back edge. This slot receives the main panel 202 of the bracket 203. This panel has a base flange 204 and a back flange 205. The base flange 204 seats against the bottom surface of the shelf and the back flange seats against a suitable anchor means such as a vertical channel extending between the main rails 11 and 12. Such a vertical channel is suggested by the channel 250 illustrated in FIGS. 1 and 2. The channel 250 can be of the same general configuration as the main rails 11 and 12. Thus, the bracket 203 can be mounted by a screw and nut assembly such as the screw 43 and nut 42 illustrated in FIG. 17. This bracket makes a neat support of high strength with the advantage of supporting the shelf from beneath. Where it is spaced inwardly from the ends of the shelf, as illustrated, its main panel 202 may function as a book end.

Figure 14:
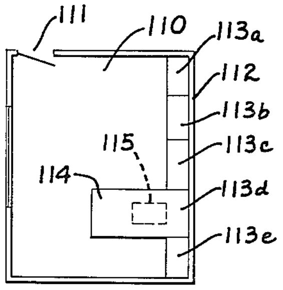
FIG. 14 is a schematic diagram of a room equipped with this invention with the bed lowered.
Figure 15:
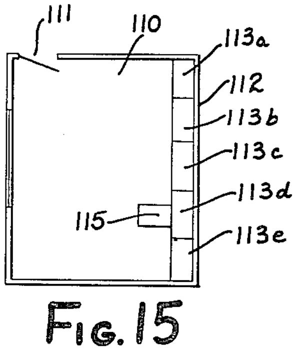
FIG. 15 is a schematic view of the same room as illustrated in FIG. 14, with the bed raised.

FIGS. 14 and 15 illustrate, in schematic form, the application of this invention to a single room. In these figures, the room 110 has an entrance door 111 and along the wall 112 this invention has been installed to divide the wall into storage compartments 113*a–e*. The compartment 113*d* is a bed 114 shown, in FIG. 14, in open position. FIG. 15 illustrates the same room with the same facilities but with the bed 114 folded into storage position and a second service unit such as a chair 115 in open position. It is obvious from this comparison that this invention provides a marked improvement in space economy and utility in a room. The crowding effect which a conventional bed creates in a room is eliminated during the daytime when the bed is, for all practical purposes, inoperative. It also shows that the room has greater spaciousness at night when the bed is down because the chair 115, which serves no useful purpose at that time, is stored beneath the bed.

Figure 16:
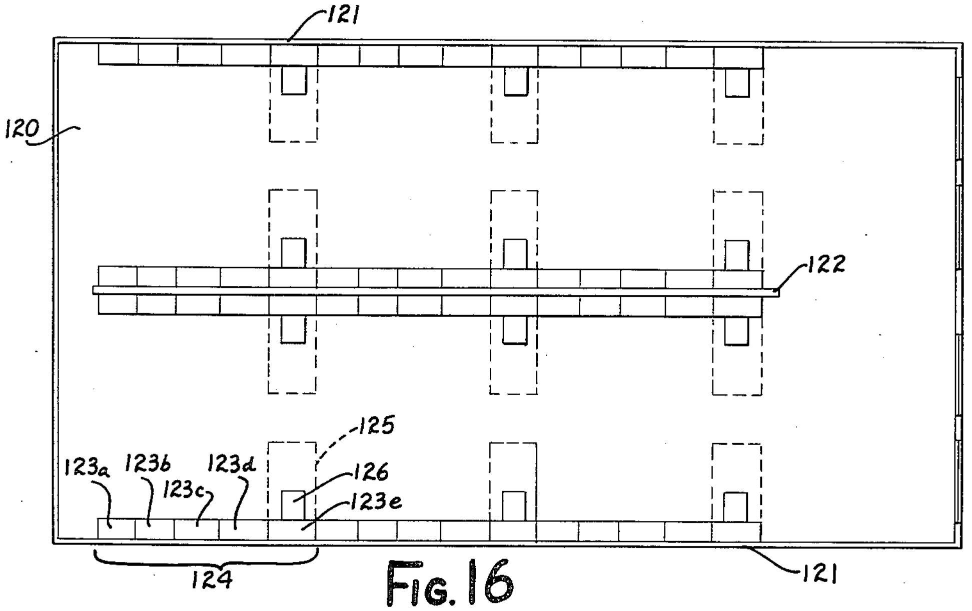
FIG. 16 is a schematic diagram of a large area such as a dormitory equipped with this invention.

While FIGS. 14 and 15 illustrate the application of this invention to a single room, FIG. 16 illustrates its application to a large area such as a dormitory. In this case the dormitory consists of one large room 120 having a pair of long side walls 121. The center of the room has a divider or partition 122. Compartments 123*a–e* are mounted to each of the walls 121 and to the partition 122 in repeated groups 124. Each group of storage units includes a bed 125 installed according to this invention. The beds 125 are shown in solid lines in folded or raised position and in broken lines in open or operating position.

It will be noted that the beds in raised position leave the area completely free between the two banks of storage compartments, creating a large area for daytime use free of all obstruction. Thus, the room has substantially greater utility and capacity than does a conventional dormitory. As indicated in FIG. 16, when the beds 125 are folded into their storage position, they may, on the back, have another unit such as a desk 126. This may be folded down, if desired, for study or other use when the bed is in storage.

It will be seen through this illustration and the ones shown in FIGS. 14 and 15 that this invention has many applications in which it permits dual use of a given room area. This, in turn, permits the room area to be reduced without in any way reducing the room's utility and adaptability for the uses for which it was originally designed.

This invention has a number of advantages in the construction of a building in addition to those obtained from its use. The inner or back edges of the panels 30 are spaced a short distance from the face of the wall. This eliminates interference between the panels and the wall due to unevenness in the wall. This is possible since the panels are supported entirely from the two rails and do not require contact with the wall. If tight contact with the wall is required, a compressible gasket may be applied to the back edge of the panel which will be pressed against the wall when the panels 30 are installed. The provision of a small space between the wall and the panel eliminates much labor expense normally experienced in making a close fit to an uneven surface. It also simplifies redecoration of the walls.

The panels 30 and all facilities installed between the panel are prefinished. This permits the economy of factory prefinishing and mass production. The high labor factor required in the finishing of conventional built-in facilities is entirely eliminated. This is a substantial factor. Further, since the entire invention except the rails 11 and 12 are detachably hung from the walls, the rooms may be completely finished including painting, carpeting or tiling before the panels are installed. This eliminates possible damage to the units during painting and other finishing operations. Furthermore, it leaves the room itself a simple and uncomplicated area to finish particularly suited to such rapid finishing operations as spraying. A minimum of time consuming masking and hand painting are needed. This again results in a major cost reduction.

The units comprising this invention, except the rails 11 and 12, may be prepackaged at the factory with all the components required for each compartment shipped in knocked-down condition as a group. These may be erected from simple instructions by unskilled labor with only a screw driver.

Since the room and the units are independent of each other in such matters as finishes, colors and, except for the rails, in means of attachment, the subsequent removal or rearrangement of the facilities leaves no damaged or unpainted area. This alone is a major advance over conventional built-in facilities.

While a preferred embodiment and execution of this invention has been illustrated and described, modifications thereof can be made. Such of these modifications as incorporate the principles of this invention are to be considered as included in the hereinafter appended claims, unless these claims, by their language, expressly state otherwise.

We claim:

1. In combination, a system for furnishing a room having a floor, a ceiling and a wall, said combination comprising: a pair of independent parallel vertically spaced anchor rails mounted to said wall and extending substantially the length thereof generally parallel to said floor; a plurality of divider panels each projecting from said wall a substantial distance into the room; each of said divider panels having a pair of bracket members thereon, one engaging each of said anchor rails, each of said divider panels being independently slidable along said anchor rails; said panels being spaced along said wall to divide the area of said room adjacent said wall into a selected number of compartments; selected units of furniture including those of the type normally supported on a floor disposed in some of said compartments and each mounted to and supported by a pair of said panels forming the compartment in which it is mounted; each of said panels and the portions of said units of furniture confined between said panels being spaced from both said floor and said ceiling; each of said compartments being at least partially open at both the top and bottom thereof for allowing the flow of air through said compartments.

2. In combination with a room having a wall, floor and a ceiling and rail means mounted on said wall and extending substantially the length of said wall parallel to and in spaced relation to said floor; a plurality of panels each having a hanger element slidably engaging each of said upper and lower rail means for sliding movement along said rail means, said hanger elements being the sole means of support for said panels; said panels being substantially normal to said wall, projecting a substantial distance outwardly therefrom and each independently movable along said rails for spacing them apart lengthwise thereof to define a plurality of compartments adjacent said wall; units of furniture of random lengths detachably mounted to and suspended between pairs of said panels in said compartments; each of said units of furniture sharing at least one of said panels in common with an adjacent unit of furniture; said units of furniture being interchangeable from one compartment to another and said panels being movable lengthwise of said wall for adapting the size of each compartment to receive the unit of furniture selected therefor.

3. In combination, a system for furnishing a room having a floor, a ceiling and a wall, said combination comprising: a pair of independent parallel vertically spaced anchor rails mounted to said wall and extending substantially the length thereof generally parallel to said floor; a plurality of divider panels each projecting from said wall a substantial distance into the room; each of said divider panels having anchor means thereon engaging each of said anchor rails, each of said divider panels being independently slidable along said anchor rails; said panels being spaced along said wall to divide the area of said room adjacent said wall into a selected number of compartments; selected units of furniture including those of the type normally supported on a floor disposed in some of said compartments and each mounted to and supported by a pair of said panels forming the compartment in which it is mounted; each of said panels and the portions of said units of furniture confined between said panels being spaced from both said floor and said ceiling; each of said compartments being at least partially open at both the top and bottom thereof for allowing the flowing of air through said compartments.

4. In combination with a room having a wall, floor and a ceiling and rail means mounted on said wall and extending substantially the length of said wall parallel to and in spaced relation to said floor; a plurality of panels each having a hanger element slidably engaging each of said upper and lower rail means for sliding movement along said rail means, said hanger elements being the sole means of support for said panels; said panels being substantially normal to said wall, projecting a substantial distance outwardly therefrom and each independently movable along said rails for spacing them apart lengthwise thereof to define a plurality of compartments adjacent said wall; units of furniture of random lengths detachably mounted to and suspended between pairs of said panels in said compartments; some of said units of furniture sharing at least one of said panels in common with an adjacent unit of furniture; said units of furniture being interchangeable from one compartment to another and said panels being movable lengthwise of said wall for adapting the size of each compartment to receive the unit of furniture selected therefor.

References Cited in the file of this patent

UNITED STATES PATENTS

| | | |
|---|---|---|
| 2,031,718 | Kress | Feb. 25, 1936 |
| 2,499,240 | Aiken | Feb. 28, 1950 |
| 2,999,599 | Jentzen | Sept. 12, 1961 |

FOREIGN PATENTS

| | | |
|---|---|---|
| 552,195 | Italy | Nov. 28, 1956 |